United States Patent [19]

Van Huisen et al.

[11] 4,248,306
[45] Feb. 3, 1981

[54] GEOTHERMAL PETROLEUM REFINING

[76] Inventors: Allan T. Van Huisen, 29456 Indian Valley Rd., Rolling Hills Estates; Paul E. Griffin, 853 Via Del Monte, Palos Verdes Estates, both of Calif. 90274

[21] Appl. No.: 25,755

[22] Filed: Apr. 2, 1979

[51] Int. Cl.³ .................. B01J 21/00; E21B 43/24; F28D 15/00
[52] U.S. Cl. .................. 166/305 R; 166/57; 166/267; 165/45; 196/120; 208/113; 208/130
[58] Field of Search .......... 208/113, 370, 347, 363, 208/106, 108, 130, 131; 196/120; 166/268, 272, 303, 305 R; 165/45, 1; 60/641

[56] References Cited
U.S. PATENT DOCUMENTS

| 781,908 | 2/1905 | Richards | 208/370 X |
|---|---|---|---|
| 2,937,987 | 5/1960 | Jenkins | 208/108 |
| 3,154,385 | 10/1964 | Jacobs et al. | 208/130 X |
| 3,412,011 | 11/1968 | Lindsay | 208/113 |
| 3,679,264 | 7/1972 | Van Huisen | 166/303 X |
| 4,060,988 | 12/1977 | Arnold | 166/268 X |
| 4,079,590 | 3/1978 | Sheinbaum | 166/268 X |
| 4,085,795 | 4/1978 | Gill | 60/641 X |

Primary Examiner—Stephen J. Novosad
Attorney, Agent, or Firm—Poms, Smith, Lande & Rose

[57] ABSTRACT

Petroleum is distilled into fractions and/or cracked to form gas and/or lighter oil fractions by pumping the oil into the boiler section of a unit disposed in a hot, deep, subterranean geothermal zone. The distillation can be aided by forming steam from the geothermal heat as a thermal carrier.

14 Claims, 5 Drawing Figures

GEOTHERMAL PETROLEUM REFINING

CROSS-REFERENCE TO DISCLOSURE DOCUMENT

The present invention is disclosed in Disclosure Document No. 059300 recorded in the U.S. Patent Office on Apr. 1, 1977.

BACKGROUND OF THE INVENTION

The present invention relates to petroleum refining and, more particularly, to petroleum distillation and/or cracking conducted in a unit disposed in a geothermally heated subsurface zone.

DESCRIPTION OF THE PRIOR ART

Petroleum is a complex liquid mixture of organic compounds obtained from certain points in the upper strata of the earth. The chief components of this very complex mixture are hydrocarbons. Petroleum is refined, that is, separated into useful products by dividing the petroleum into fractions of different boiling ranges, by distillation and by special treatments of the fraction to remove undesirable components. The main fractions are gas, light naphtha (240° F.), heavy naphtha (340° F.), Kerosene (420° F.), gas oil (500° F.), paraffin (600° F.) and high boiling residue (800° F.). The residue can be distilled under reduced pressure for the recovery of an overhead product suitable for refining into lubricating oils or for use as a feed stock for cracking or used directly as fuel. Thermal cracking results not only in smaller molecules of higher volatility, but also in the production of olefins and aromatic hydrocarbons. The cracking process results in not only a higher yield of gasoline but also in a product with higher octane number. Thermal cracking is carried out at temperatures between 400° and 600° C. at increased pressure of 175-250 psi. The amount of material in the liquid phase is increased. The cracking reaction is accelerated in presence of solid catalyst such as natural clays or synthetic aluminum silicate mixtures and catalytic cracking can be carried out at 450°-500° C., at relatively low pressure of 10-50 psi.

Though both of these processes result in the conversion of a larger portion of the petroleum to commercially useful fuels, both processes suffer an energy penalty in requiring an addition of significant amounts of high thermal energies to the crude oil to effect conversion.

SUMMARY OF THE INVENTION

It has now been discovered in accordance with this invention that crude petroleum oil can be distilled into fractions and/or cracked to form gas or lighter oil fractions by pumping the oil into a refining unit disposed in hot subsurface geothermal zone. The upwardly rising product gases and distillate fractions heat the downwardly flowing crude oil. The refining unit is housed in a cased geothermal well and in the portion of the casing disposed in a hot geothermal zone having a temperature of at least 300°, preferably 500°-800° or higher. Means for delivering crude oil to the refining unit are provided and liquid products and gas outlets are provided to recover the desired fractions. The viscous bottom residue oil can be removed to the surface for further treatment or use as fuel or cracked therein to lighter liquid and/or gaseous fuel products.

The process of this invention can be practiced close to the source of crude oil, if a geothermal zone having an appropriate temperature is located nearby. If not, the crude oil can be delivered to a location where high geothermal temperatures are reached in fairly shallow depths. Other aspects of the invention relate to generation of steam within the geothermal well for use in the distillation reaction either directly or to remove certain molecules from the petroleum feed or to aid in delivering portions of the fractions to the surface.

These and many other objects and attendant advantages of the invention will become apparent as the invention becomes better understood by reference to the following detailed description when considered in conjunction with the accompanying drawings.

DESCRIPTION OF THE PREFERRED EMBODIMENTS

Figure 1:
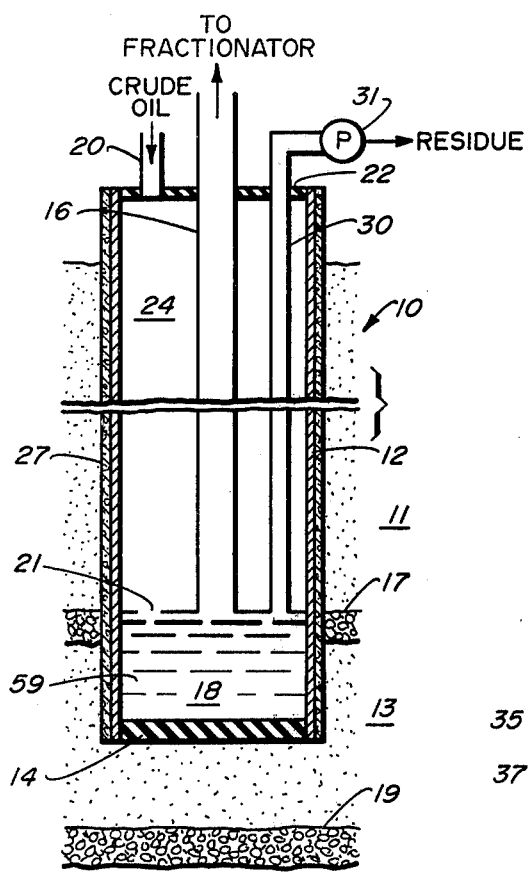
FIG. 1 is a schematic view, partly in section of a first embodiment of a geothermal petroleum refining distillation system.

Referring now to FIG. 1, the geothermal petroleum refining system of the invention generally includes a geothermal well 10 extending from the surface into a geothermal zone 13 having a temperature of at least 300° F., preferably at least 500° F. The zone 13 is preferably a wet geothermal zone containing pressurized hot water which acts as an efficient thermal carrier for the geothermal heat. Wet pressurized zones are usually disposed between impervious layers 17, 19, such as shale.

The normal geothermal gradient is about 3° C. for each 330 feet of depth. Abnormal gradients occur in many instances due to faulting, volcanism, metamorphosis, chemical and radiological action. Petroleum fields are entrapments usually associated with faults in which the hot magna invades upper strata providing hot geothermal temperatures close to the surface. Thus, it is very likely that a feasible geothermal refining system can be located near to a petroleum production field minimizing storage and transportation costs.

The well 10 includes an outer layer 27, suitably cement, which seals the surfaces of the well extending through porous strata 11. The well 10 is usually provided with a metal casing 12 which is terminated with a plug 4 and a well head 22. The lower portion of the well 10 extending into the geothermal zone 13 includes a refining section 18 for receiving a flow of crude oil. The crude oil is supplied through inlet 20 and flows through the annulus 24 surrounding vapor duct 16 and through opening 21 into the refining section 18 to form a body of oil 59. As the oil is geothermally heated, vapors rise through duct 16 and heat the downwardly flowing oil in annulus 24 and proceed to the surface for further treatment such as fractionation. Non-boiling residue is removed through pipe 30 by means of pump 31. If the temperature in the unit 18 is high, suitably above 700° F., some thermal cracking may occur.

Figure 2:
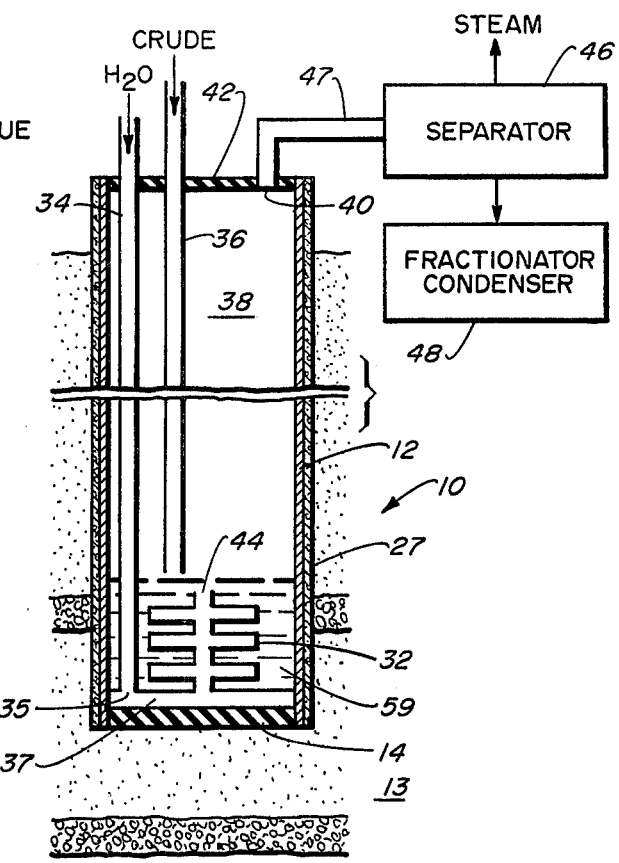
FIG. 2 is a schematic view partly in section of a pipe still embodiment of a geothermal petroleum refining unit.

In the geothermal refining unit of FIG. 2 distillation of the crude oil 59 is conducted by means of a pipe still 32. The well head 42 contains ports for sealingly receiving a water conduit 34, crude conduit 36 and vapor stack 47 communicating with outlet 40. The outlet 35 of the water conduit extends into a steam boiler section 37. The steam generated by the geothermal heat from zone 13 enters the pipe still and heats the body of oil 59 to vaporize fractions having a boiling point below the temperature in the zone 13. The still 32 may have a steam outlet 44. The steam injected into the oil 59 can extract some miscible components by steam distillation and serves to entrain higher boiling residue components. The generated vapors and the steam and entrained liquid rise through the annulus 38 through outlet 40 and stack 47 into separator 46 from which steam and water are removed and then into fractionator-condenser 48.

Figure 3:
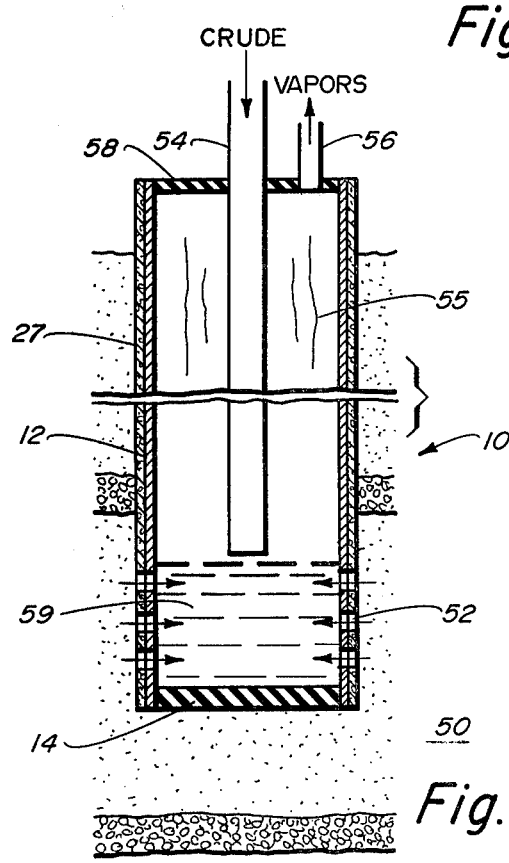
FIG. 3 is a schematic view partly in section of a geothermal petroleum refining system utilizing geothermal steam.

Referring now to FIG. 3, generation of steam by injecting water from the surface may not be required if the bottom portion of well 10 containing the distillation unit is disposed in a wet, pressurized geothermal zone 50. Geothermal heat and geothermal steam from the zone entering perforations 52 distill fractions from the oil 59. The distilled vapors 55 heat the downwardly falling crude in conduit 54 and rise and are recovered through vapor outlet 56 provided in well head 58.

In the case a dry, fractured geothermal zone, the steam necessary for distillation and to aid in removing residue can be provided by injecting water into the zone to generate steam. The water can be injected adjacent the well into the zone below the end of the casing or can be injected through the plug.

Figure 4:
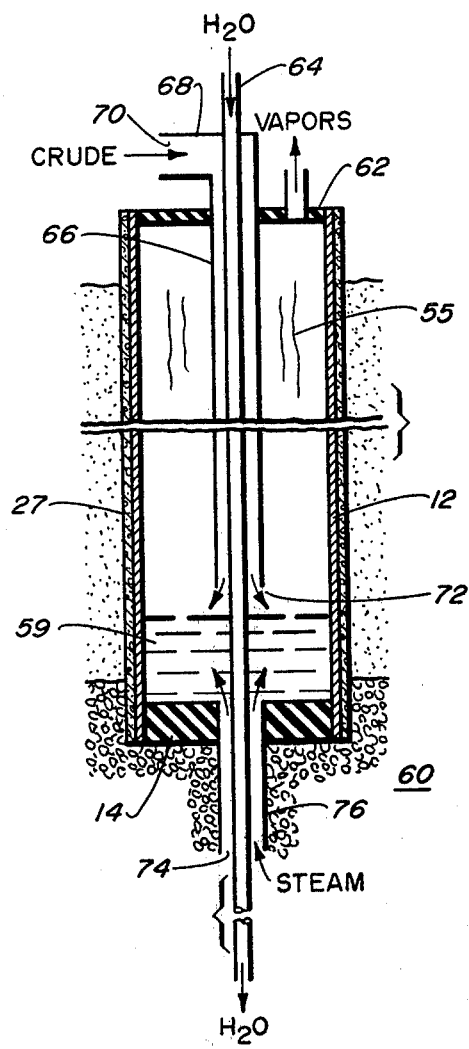
FIG. 4 is a schematic view of an embodiment in which water is injected into the geothermal zone to generate steam.

Referring now to FIG. 4, a central water injection pipe 64 is surrounded with a crude delivery pipe 68 extends through the oil 59 in the refining section and then through the plug 14 surrounded by steam delivery conduit 76. The lower end of pipe 64 is below the end of conduit 76. Crude is delivered to inlet 70 and flows through the annulus of the the concentric assembly of pipes 64, 66 and out outlet 72 into the refining unit to form the distillable body of oil 59. The water injected into the lower portion of zone 60 is vaporized to form steam which flows through annulus 74, into the body of oil 59, causes distillation thereof to form vapors 55 which are recovered through outlet 62.

Though some cracking may occur due to thermal causes, additional cracking of the larger, less volatile components of the crude can be effected by disposing a cracking catalyst within the portion of the geothermal well within the hot zone 13.

Figure 5:
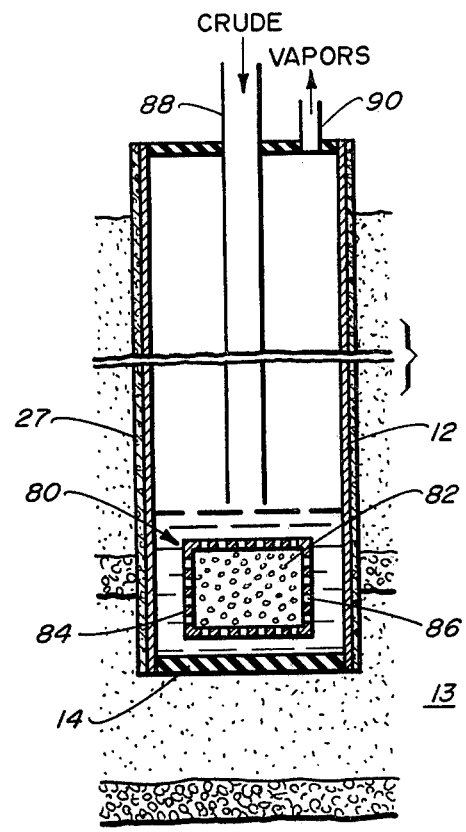
FIG. 5 is a schematic view of a geothermal petroleum refining system incorporating catalytic cracking assembly.

Referring now to FIG. 5, a perforated basket 80 containing solid, particulate cracking catalyst 82 is disposed within the zone 13. The walls 84 of the basket contain perforations 86. As the oil 59 enters the perforations and contacts the particles 82 of catalyst carbon-carbon bonds are broken to form smaller more volatile molecules. The distilled vapors rise through the annular space in casing 12, heat the crude in pipe 88 and are recovered through outlet 90 for further processing. The basket 90 can be removed periodically to replace or regenerate the catalyst or the crude flow to the well can be interrupted to regenerate the catalyst thermally within the zone 13 to burn off coke deposits or by flushing regenerating fluids onto the catalyst through conduit 88. Cracking catalysts are generally natural clays or synthetic alumina-silica mixtures. Catalytic cracking can be carried out at relatively low pressures of 10-50 psi and at temperatures as low as 450° to 500° F. Cracking also increases octane number due to the formation of olefins and aromatic hydrocarbons. Straight run gasoline can be run through the unit of FIG. 5 to increase octane number, an operation known as reforming.

Grade #2 fuel oil is the designation given to the heating oil commonly used for home heating and much commercial space heating. This is a distillate product, normally fractionated to a boiling range of 350 degrees to 650 degrees F., (177 to 343 degrees C.). Texas, Mississippi, New Mexico and Louisiana crude oils have API gravities between approximately 35 and 40 (American Petroleum Institute-API) and yields from 25 to 35 percent gasoline (this fraction boiling below about 400 degree F.) by volume.

Major fractions which are subject to later separations and ideal for geothermal energy distillation as envisioned in this invention are: (1) a light straight-run fraction, consisting of primarily $C_4$, $C_5$ and $C_6$ hydrocarbons and lighter gaseous hydrocarbons dissolved in the crude; (2) a naphtha fraction having a nominal boiling range of 200 to 400 degrees F.; (3) light distillate with a boiling range of 400 to 650 degrees F.

It is to be understood that only preferred embodiments of the invention have been described and that numerous substitutions, modifications and alterations are permissible without departing from the spirit and scope of the invention as defined in the following claims.

What is claimed is:

1. A geothermal system for refining petroleum oils comprising in combination:
    a geological formation including a subsurface geothermal zone having a temperature of at least 300° F.;
    well means extending from the surface into the zone;
    a unit for receiving crude oil disposed within the portion of the well disposed in the zone and for distilling the oil therein;
    cracking means including solid catalyst retained in a perforated container included within the unit; and
    means for delivering crude oil to the unit and means for recovering vapors from the unit.

2. A system according to claim 1 further including means for recovering non-distillate fraction of oil from the unit.

3. A method of refining petroleum oil comprising the steps of:
    injecting crude oil from the surface into a unit disposed in a subsurface geothermal zone having a temperature of at least 300° F.;
    generating steam within the unit;
    injecting said steam into the oil contained in said unit;
    distilling fractions from the oil in said unit; and
    delivering the distilled vapors from the unit to the surface.

4. A method according to claim 3 in which the zone has a temperature of at least 500° F. and further including the step of thermally cracking the oil in said unit.

5. A method according to claim 3 further including the steps of delivering cracking catalyst in the unit, contacting the oil with the catalyst and catalytically cracking the oil.

6. A method according to claim 3 further including the step of recovering non-distillable oil from said unit.

7. A geothermal system for refining petroleum oils comprising in combination;
- a geological formation including a subsurface geothermal zone having a temperature of at least 300° F.;
- well means extending from the surface into the zone;
- a unit for receiving crude oil disposed within the portion of the well disposed in the zone and for distilling the oil therein;
- means for generating steam within the unit and for injecting steam into the oil; and
- means for delivering crude oil to the unit and means for recovering vapors from the unit.

8. A system according to claim 7 in which the unit includes a pipe still and means for delivering water to the pipe still.

9. A geothermal system for refining petroleum oils comprising in combination:
- a geological formation including a subsurface zone having a temperature of at least 300° F.;
- well means extending from the surface into the zone;
- a unit for receiving crude oil disposed within the portion of the well disposed in the zone and for distilling the oil therein;
- means for injecting steam into oil contained in the unit from the zone; and
- means for delivering crude oil to the unit and means for recovering vapors from the unit.

10. A system according to claim 9 in which the zone is a pressurized wet geothermal zone, the well includes a metal casing and the steam injection means includes perforations in the casing communicating with the unit.

11. A system according to claim 9 in which the zone is a fractured dry geothermal zone and the steam injection means includes means for injecting water from the surface into the zone below the end of the well for generating steam in the zone and inlet means provided in the well for injecting the geothermally generated steam into the unit.

12. A system according to claim 11 in which the water injection means is concentric with the crude delivery means and steam inlet means.

13. A method of refining petroleum oil comprising the steps of:
- injecting crude oil from the surface into a unit disposed in a pressurized, wet, geothermal zone having a temperature of at least 300° F.;
- injecting geothermal steam from the zone into the oil contained in said unit;
- distilling fractions from the oil in said unit; and
- delivering the distilled vapors from the unit to surface.

14. A method according to claim 13 in which the zone is dry and further including the step of injecting water into the zone to generate said steam.

* * * * *